(12) United States Patent
Warnecke et al.

(10) Patent No.: US 6,485,597 B1
(45) Date of Patent: Nov. 26, 2002

(54) PROCESS FOR MAKING AN ELASTOMER ASSEMBLY

(75) Inventors: Hans-Jürgen Warnecke, Goslar (DE); Josef Markus, Bockenem (DE)

(73) Assignee: Meteor Gummiwerke K. H. Bädje GmbH & Co., Bockenem (DE)

( * ) Notice: Subject to any disclaimer, the term of this patent is extended or adjusted under 35 U.S.C. 154(b) by 0 days.

(21) Appl. No.: 09/578,946

(22) Filed: May 25, 2000

(30) Foreign Application Priority Data

May 29, 1999 (DE) .......................................... 199 24 809

(51) Int. Cl.$^7$ .......................... B29C 47/06; B32B 31/14
(52) U.S. Cl. .......................... 156/244.24; 156/244.25; 156/309.6; 156/556
(58) Field of Search ................. 156/244.11, 244.24, 156/244.25, 309.6, 308.2, 556, 559; 49/475.1–499.1

(56) References Cited

U.S. PATENT DOCUMENTS

| 4,114,320 A | * | 9/1978 | Pullan | 428/122 |
| 5,123,988 A | * | 6/1992 | Iwasa | 156/244.11 |
| 5,552,194 A | * | 9/1996 | Ito et al. | 156/106 |
| 6,024,906 A | * | 2/2000 | Cook | 156/244.13 |
| 6,106,911 A | * | 8/2000 | Dupuy | 428/122 |
| 6,117,265 A | * | 9/2000 | Cittadini et al. | 156/258 |

FOREIGN PATENT DOCUMENTS

EP 0 325 830 3/1988 ........... B32B/25/08

\* cited by examiner

Primary Examiner—Michael W. Ball
Assistant Examiner—Barbara J Musser
(74) Attorney, Agent, or Firm—Synnestvedt & Lechner LLP

(57) ABSTRACT

Shaped elastomer portions are to be produced on an elastomer seal. For that purpose the shaped elastomer portions are provided with a thermoplastic layer, preferably by co-extrusion. The thermoplastic layer is converted into a molten state by heating. The shaped elastomer portions are then pressed against oppositely disposed regions of the elastomer seal and cooled until the thermoplastic layer has hardened again and a fixed bond has occurred on the one hand in relation to the shaped elastomer portions and on the other hand to the elastomer seal.

12 Claims, 5 Drawing Sheets

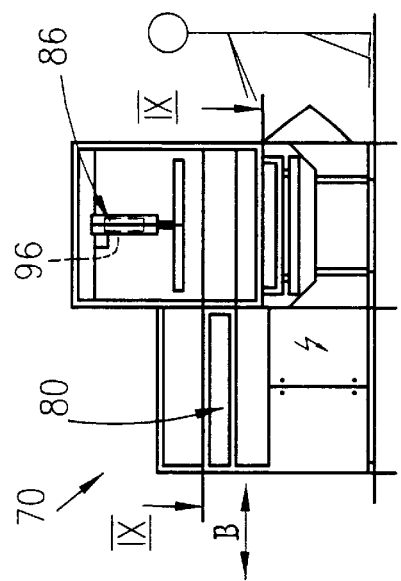
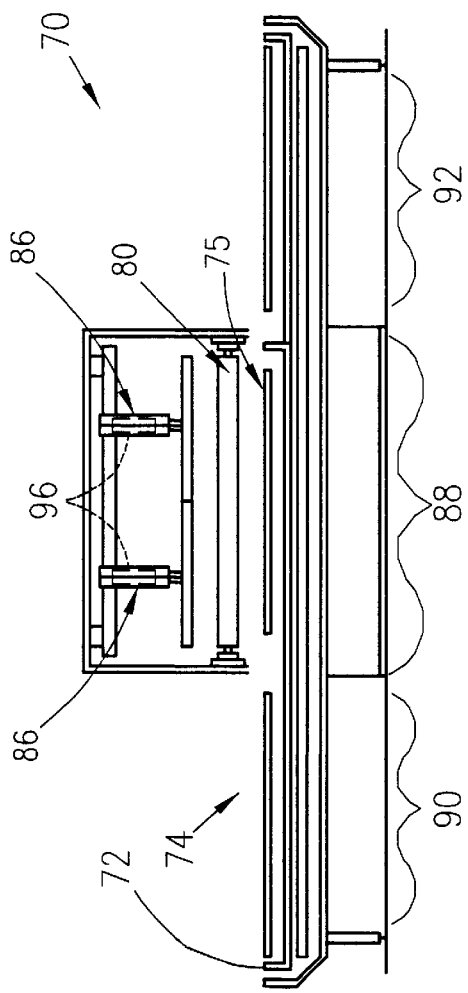
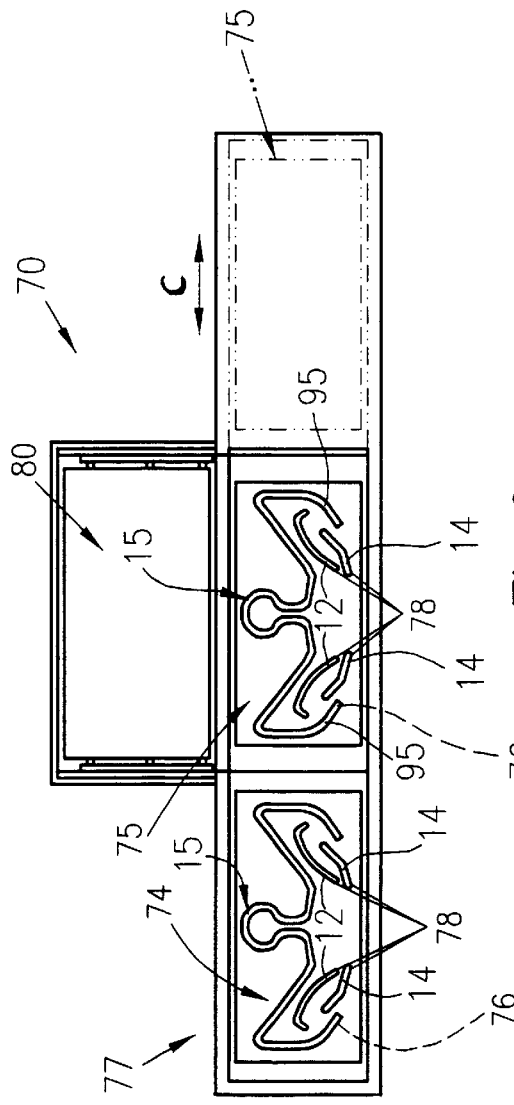

PROCESS FOR MAKING AN ELASTOMER ASSEMBLY

BACKGROUND

The invention concerns a process for making an elastomer assembly having an elastomer seal and at least one shaped elastomer portion.

Elastomer assemblies are known from a practical context in the area of vehicle construction, in which shaped elastomer portions and injection-molded portions are assembled to form an elastomer seal, for example a door frame seal. Previously, locally laminated elastomer profile portions have been produced on such elastomer seals, being applied thereto by hand. That procedure results in an elastomer assembly, the manufacture of which is comparatively complicated and expensive as the elastomer seal is generally of great length and is difficult to handle because of its flexibility. Furthermore, close tolerances are required for elastomer assemblies such that manufacturing procedures which were implemented previously by hand are complicated and expensive.

SUMMARY OF THE INVENTION

The object of the present invention is to facilitate and improve the production of such elastomer assemblies.

That object is attained by the present invention which provides for a process for making an elastomer assembly having an elastomer seal and at least one shaped elastomer portion, wherein in a step (a) a thermoplastic layer is applied to each shaped elastomer portion. In a step (b) the thermoplastic layer is converted into a molten state by heating. In a step (c) the elastomer seal and the at least one shaped elastomer portion are brought together along the thermoplastic layer, and, in a step (d) after the assembly operation of step (c), the thermoplastic layer is cooled down until the elastomer seal and the at least one shaped elastomer portion are fixedly connected together. The thermoplastic layer which is firstly converted into the molten state and then hardened again by cooling provides for a very firm and secure connection between the shaped elastomer portions and the elastomer seal. In addition this manufacturing procedure is effected in advantageously close production tolerances.

In step (a) above, a main elastomer body of each shaped elastomer portion and the thermoplastic layer can be co-extruded. In accordance with this feature, the subsequent application of an adhesive in an additional working step is avoided and the thermoplastic layer is applied very uniformly and in firmly bonded relationship to the shaped elastomer portion.

Furthermore, in step (a), the thermoplastic layer can be applied only to a first peripheral portion of each shaped elastomer portion. These features are sufficient to subsequently achieve an adequate connection to the elastomer seal.

As another feature, between steps (a) and (b) a textile cover can be applied by a laminating procedure to a second peripheral portion of each shaped elastomer portion. In accordance with this feature, the shaped elastomer portions can be produced in any desired manner by lamination.

Each shaped elastomer portion can be cut to length after step (a) and prior to step (b). Here, the shaped elastomer portions can be inexpensively produced by extrusion and subsequently cut to size.

The invention further provides a process as set forth above wherein between steps (a) and (b) at least a part of the length of the elastomer seal and the at least one shaped elastomer portion are introduced into a holding apparatus, the at least one shaped elastomer portion is lifted from the holding apparatus by a pick-and-place unit and positioned above an associated region of the elastomer seal, a heating apparatus is moved between the elastomer seal and the at least one shaped elastomer portion and heats the same until in step (b) the molten state of the thermoplastic layer is reached, the heating apparatus is then removed and in step (c) each shaped elastomer portion is pressed with its molten thermoplastic layer against the associated region of the elastomer seal by the pick-and-place unit, thereafter cooling in accordance with step (d) and movement of the pick-and-place unit away from the holding apparatus are effected, and then the elastomer assembly in the finished manufactured condition is removed from the holding apparatus. In accordance with this aspect of the invention, only the operation of introducing the elastomer seal and the shaped elastomer portions into the holding apparatus and the operation of removing the elastomer assembly in the finished manufactured condition from the holding apparatus are effected by hand. All other steps in the process are implemented by machine and with a correspondingly high level of precision. This has a highly advantageous effect on the dimensional accuracy and quality of the elastomer assembly. In principle only that part of the length of the elastomer seal which is to be subsequently produced with the at least one shaped elastomer portion is introduced into the holding apparatus. The remaining length of the elastomer seal is put down in a suitable fashion so that it does not interfere with the manufacturing procedure. It is possible in that way in one working operation to produce complete elastomer assemblies for a motor vehicle, for example the right-hand and left-hand door frames and a connecting portion along the windshield.

The invention further provides a process as set forth above wherein between steps (a) and (b) at least a part of the length of the elastomer seal and the at least one shaped elastomer portion are introduced into a holding apparatus in at least one handling station, the holding apparatus is thereafter moved into a processing station, in the processing station the at least one shaped elastomer portion is lifted from the holding apparatus by a pick-and-place unit and positioned above an associated region of the elastomer seal, in the processing station a heating apparatus is moved between the elastomer seal and the at least one shaped elastomer portion and heats the same until in step (b) the molten state of the thermoplastic layer is reached, then in the processing station the heating apparatus is removed and in step (c) each shaped elastomer portion is pressed with its molten thermoplastic layer against the associated region of the elastomer seal by the pick-and-place unit, thereafter cooling in accordance with step (d) and movement of the pick-and-place unit away from the holding apparatus are effected in the processing station, then the holding apparatus with the elastomer assembly in the finished manufactured condition is moved out of the processing station into the at least one handling station, and in said handling station the elastomer assembly is removed from the holding apparatus. The stations make it possible to increase efficiency and output in regard to making the elastomer assemblies.

Two holding apparatuses can be provided, and when one of the holding apparatuses is in the at least one handling station the other holding apparatus is arranged in the processing station. These features result in a further increase in efficiency and output.

The thermoplastic layer can comprise a modified polypropylene, and the thickness of the thermoplastic layer after step (a) can be between 0.1 mm and 0.6 mm, in particular about 0.3 mm. These features afford highly reliable connections between the shaped elastomer portions and the elastomer seal.

A further object of the invention is to provide an apparatus for making an elastomer seal and at least one shaped elastomer portion in the form of an elastomer assembly.

That object is attained by an apparatus for making an elastomer assembly having an elastomer seal and at least one shaped elastomer portion, the apparatus having a holding apparatus for receiving at least a part of the length of the elastomer seal and the at least one shaped elastomer portion, a thermoplastic layer facing towards the holding apparatus on each shaped elastomer portion, a pick-and-place unit with which the at least one shaped elastomer portion can be lifted from the holding apparatus and after a heating operation pressed against an associated region of the elastomer seal, and a heating apparatus temporarily movable between the holding apparatus and the pick-and-place unit for implementing the heating operation until the thermoplastic layer is in a molten state. The production procedure which is implemented substantially by machine affords elastomer assemblies of a high level of precision and operational reliability.

A cooling apparatus can be provided for cooling the manufactured elastomer assembly. This feature serves to accelerate hardening of the thermoplastic layer and thus the production of a strong bond between the shaped elastomer portions and the elastomer seal.

The cooling apparatus can be integrated into the pick-and-place unit. This affords a compact and effective cooling apparatus. Cooling already begins while the shaped elastomer portions are still being pressed by the pick-and-place unit against the elastomer seal.

The holding apparatus can have a respective cavity for the elastomer seal and the at least one shaped elastomer portion. In accordance with this feature, introduction of the elastomer seal and the shaped elastomer portions into the holding apparatus is facilitated.

The invention further provides for an apparatus as set forth above wherein there are provided two holding apparatuses, in at least one handling station the elastomer seal and the at least one shaped elastomer portion can be introduced into a first one of the holding apparatuses, the loaded first holding apparatus is movable into a processing station, the pick-and-place unit, the heating apparatus and the cooling apparatus are associated with the processing station, the first holding apparatus with the elastomer assembly in the finished manufactured condition is movable out of the processing station into the at least one handling station for removal of the elastomer assembly, and a second one of the holding apparatuses is arranged in the at least one handling station while the first holding apparatus is in the processing station. Furthermore, two handling stations can be associated with the processing station, the first holding apparatus can be reciprocal between a first one of the handling stations and the processing station, and the second holding apparatus can be reciprocal alternately with the first holding apparatus between a second one of the handling stations and the processing station. These features serve to speed up manufacture.

The holding apparatuses can be arranged on a carriage displaceable between the associated handling station and the processing station. Here, the reciprocating movement can be produced in a simple and precise manner.

In a further feature, the two holding apparatuses are rotatable about a horizontal axis arranged between them, and there is only one handling station. Here the apparatus is particularly compact and can easily be operate by just one operator.

In another feature, the holding apparatuses are arranged diametrically in relation to the horizontal axis and mounted on holding arms rotatably about their horizontal longitudinal axes relative to the holding arms, the holding arms are rotatable about the horizontal axis, and during the rotary movement of the holding arms an upper working side of each holding apparatus is always arranged upwardly. The features represent a structurally particularly advantageous configuration. The upper working side of each holding apparatus can easily always be held at the top for example by a suitable belt drive transmission.

As a further feature of the invention, the processing station is in a substantially closeable working space, and the handling station is arranged outside the working space. This facilitates temperature control, which is optimum for the procedure, in the working space or chamber, without the operator being stressed by virtue of elevated temperatures in the working space.

In another embodiment of the apparatus, a bulkhead is arranged between the holding apparatuses, the bulkhead is rotatable about the horizontal axis synchronously with the holding arms, and when the holding apparatuses are in the processing station and in the handling station the bulkhead seals off an opening in a wall of the working space. This ensures that the working space is adequately sealed off relative to the exterior during the working operation. In that way, there cannot be either unwanted heat losses out of the working space nor unwanted adverse effects due to draft into the working space.

In yet another embodiment of the apparatus the elastomer seal and the at least one shaped elastomer portion are arranged in mutually juxtaposed relationship in the holding apparatus, and besides a lifting movement the pick-and-place unit can also perform a lateral movement relative to the holding apparatus in order, prior to the at least one shaped elastomer portion being pressed against the elastomer seal, to orient the at least one shaped elastomer portion which has been lifted from the holding apparatus in aligned relationship with its associated region of the elastomer seal. This results in highly accurate alignment of the shaped elastomer portions with the elastomer seal before they are pressed together with the thermoplastic layer in the molten state.

BRIEF DESCRIPTION OF THE DRAWINGS

These and further features of the invention are described in greater detail hereinafter by means of the embodiments illustrated in the drawings in which:

FIG. 7 is a side view of an apparatus according to the invention, FIG. 8 is an end view of the apparatus shown in FIG. 7, FIG. 9 is a view in section taken along line IX—IX in FIG. 8.

DETAILED DESCRIPTION

Figure 1:
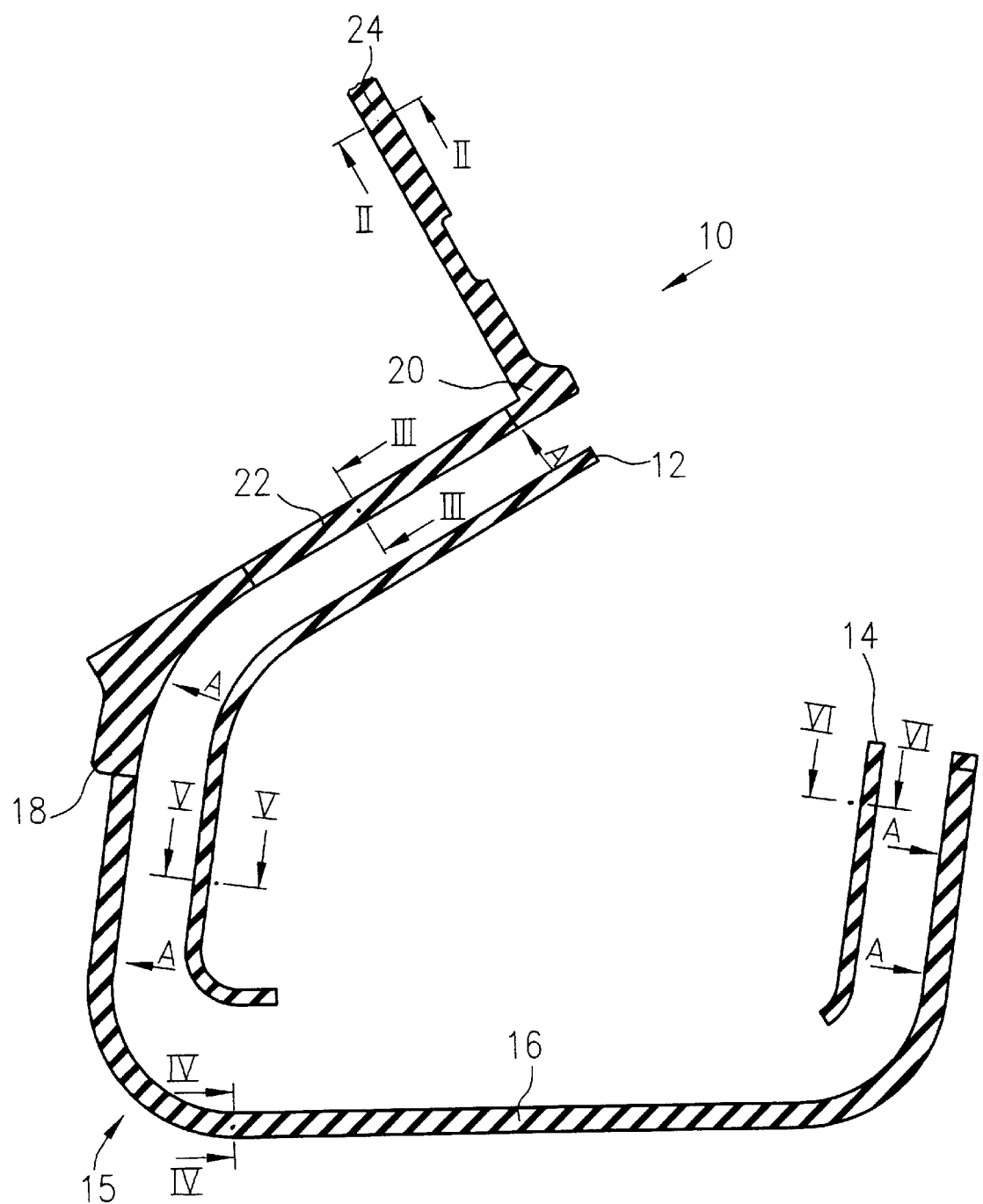
FIG. 1 is an exploded view of one half of an elastomer assembly according to the invention.

The elastomer assembly 10 of which half is shown in FIG. 1 is a convertible door seal having a first shaped elastomer portion 12 and a second shaped elastomer portion 14. The first and second shaped elastomer portions 12 and 14 are in the form of a lamination frame.

Besides the shaped elastomer portions 12, 14 the elastomer assembly 10 has an elastomer seal 15. A component of the elastomer seal 15 is a lower door frame profile portion 16 which extends from the upper rearward end of the door frame to an insert portion 18 which is to be arranged at the mirror triangle of the convertible. Arranged between the insert portion 18 and a roof frame connection portion 20 is a window seal profile portion 22. Adjoining the end of the roof frame connection portion 20, which is in opposite relationship to the window seal profile portion 22, is a roof frame profile portion 24 which extends at the top along the windshield and of which only half is shown in FIG. 1.

Figure 2:
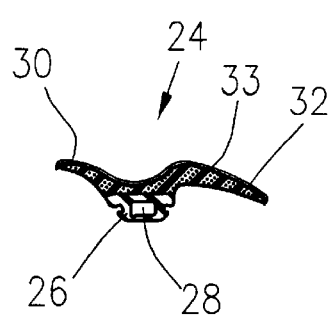
FIGS. 2 through 6 are sections through different portions of the elastomer assembly taken along lines II—II through VI—VI in FIG. 1.

The roof frame profile portion 24 which is shown in section in FIG. 2 has a profile base 26 comprising an ethylene-propylene-diene copolymer (EPDM), in which a hollow chamber 28 is formed. The profile base 26 of the roof frame profile portion 24 is formed integrally by co-extrusion with a front sealing lip 30 and a rear sealing lip 32. The sealing lips 30, 32 also comprise EPDM, but this is softer than the EPDM of the profile base 26. The sealing lips 30, 32 are provided on the top with an anti-friction lacquer layer 33.

Figure 3:
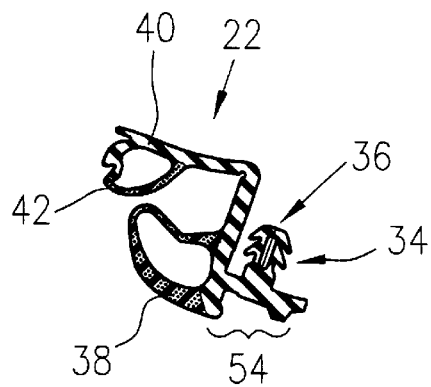

FIG. 3 shows the window seal profile portion 22 in section. The window seal profile portion 22 has an engagement base 36 which is made from hard rubber and which is provided with holding ribs 34 and to which a foam rubber tube 38 is joined. A sealing tube 42 connected to the engagement base 36 by way of a limb 40 serves to seal off a side window of the convertible, which can be introduced between the foam rubber tube 38 and the sealing tube 42. At bottom right in FIG. 3 the window seal profile portion 22 has a connection region 54 to which the first shaped elastomer portion 12 is to be firmly connected.

Figure 4:
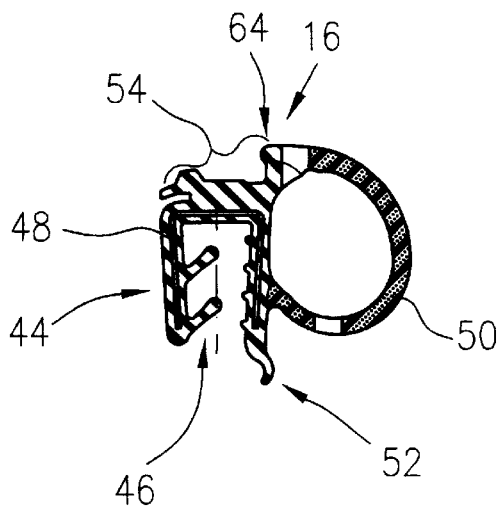

FIG. 4 shows a section through the lower door frame profile portion 16 which adjoins the window seal profile portion 22 beneath the insert portion 18 in the region of the side mirror. The lower door frame profile portion 16 has a clamping base 44 on which are provided clamping ribs 46 which are biased in the clamping direction in the clamping base 44 made from EPDM, by a reinforcing band 48 made from polyester. A door seal tube 50 made from foam rubber is joined to the clamping base 44. To provide sealing integrity in relation to moisture, a sealing lip 52 is provided on the clamping base 44 at its lower end which is towards the outside of the motor vehicle. In addition the lower door frame profile portion 16 has a connection region 54 to which the first shaped elastomer portion 12 (FIGS. 1 and 5) or a running board or sill support or cover can be fixed.

Figure 5:
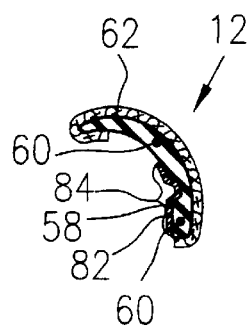

FIG. 5 shows a section through the first shaped elastomer portion 12 which is in the form of a lamination frame and which in the elastomer assembly in the finished manufactured condition engages in the connection region 54 (FIG. 4) of the lower door frame profile portion 16. The first shaped elastomer portion has a main body 58 of EPDM, into which carbon fiber threads 60 are introduced in the extrusion operation. A textile cover 62 which embraces the one end of the main body 58 and which at the other end is of such a configuration that it engages under a nose 64 formed on the lower door frame profile portion 16 is connected to the main body 58 by an adhesive, for example a hot-melt adhesive. A thermoplastic layer 82 is co-extruded on to the main body 58 in a region 84.

Figure 6:
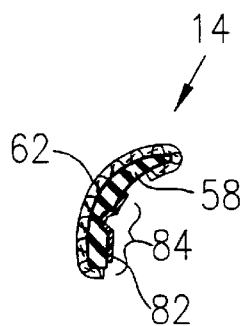

The second shaped elastomer portion 14 which is shown in FIG. 6 and which is also in the form of a lamination frame corresponds in respect of its structure to the first shaped elastomer portion 12 to which reference is therefore directed in this respect. Only the dimensions are adapted to the position of installation of the second shaped elastomer portion 14 at the rear end of the door frame.

FIG. 1 indicates by arrows A how the first and second shaped elastomer portions 12 and 14 are connected to the elastomer seal 15 which is previously composed from the lower door frame profile portion 16 the insert portion 18, the window seal profile portion 22, the roof frame connection portion 20 and the roof frame profile portion 24.

That connecting operation is implemented for example in the apparatus 70 shown in FIGS. 7 through 9. The apparatus 70 has on a carriage or slider 72 two frame-like holding apparatuses 74 and 75, in each of which are respectively provided a first cavity 76 for the elastomer seal 15 and second cavities 78 for the shaped elastomer portions 12, 14.

The apparatus 70 has a central processing station 88 and a first handling station 90 which laterally adjoins same and a second handling station 92 disposed in diametrically opposite relationship. Therefore the processing station 88 and the handling stations 90, 92 are disposed in a row in mutually juxtaposed relationship.

As shown in FIGS. 7 and 9 the carriage 72 with the two holding apparatuses 74, 75 is disposed in its left-hand end position in which the holding apparatus 74 is arranged in the first handling station 90 and the second holding apparatus 75 is arranged in the processing station 88. In that operating position, an operator can load the holding apparatus 74 in such a way that an elastomer seal 15 is introduced into the first cavity 76 and a respective shaped elastomer portion 12, 14 is introduced into each of the second cavities 78, with the thermoplastic layer 82 thereon, in a downward direction. At the same time the processing operation can be effected by machine in the processing station 88. Disposed in the processing station 88 is the holding apparatus 75, in the cavities 76, 78 of which, in the second handling station 92, an elastomer seal 15 and shaped elastomer portions 12, 14 had previously been inserted in the same manner.

Arranged above the holding apparatus 75 in the processing station 88 as shown in FIGS. 7 and 8 are pick-and-place units 86. As soon as the holding apparatus 75 has arrived at the processing station 88 the pick-and-place units 86 move downwardly, suck under the effect of a reduced pressure the shaped elastomer portions 12, 14 out of their cavities 78 and lift the shaped elastomer portions 12, 14 upwardly to such an extent that a heating apparatus 80 can be moved out of its rest position shown in FIG. 8 horizontally in the direction indicated by a double-headed arrow B between the pick-and-place units 86 with their shaped elastomer portions 12, 14 and the holding apparatus 75 with its elastomer seal 15. The heating apparatus 80 is then brought into operation and thus heats both the shaped elastomer portions 12, 14 and also the elastomer seal 15 until the thermoplastic layer 82 on the shaped elastomer portions 12, 14 has become molten. As soon as that is achieved, the heating apparatus 80 is moved out of its active position in the opposite direction of the double-headed arrow B back into its rest position as shown in FIG. 8. Then, or even before that happens, by virtue of differentiated movements within the pick-and-place units 86, the first shaped elastomer portions 12 are arranged in perpendicularly aligned relationship with associated regions 94 of the elastomer seal 15 and the second shaped elastomer portions 14 are arranged in perpendicularly aligned relationship with associated regions 95 of the elastomer seal 15. The pick-and-place units 86 are then moved downwardly, with the thermoplastic layer 82 still in a molten state, until the thermoplastic layers 82 are pressed against the regions 94, 95.

At that moment, in each pick-and-place unit 86 a cooling apparatus 96 is activated, with which cooling air is passed into the region of the thermoplastic layers 82 which are under pressure. The consequence of this is that the thermoplastic layers 82 increasingly harden again and in so doing a strong bond is produced between the shaped elastomer portions 12, 14 on the one hand and the elastomer seal 15 on the other hand. When that cooling operation has sufficiently progressed, the pick-and-place units 86 are moved back upwardly into their rest position as shown in FIGS. 7 and 8. In that case, the elastomer assembly 10 in the finished manufactured condition remains in the first cavity 76 of the holding apparatus 75.

The carriage 72 is then displaced in the direction indicated by a double-headed arrow C towards the right in FIGS. 7 and 9 until the holding apparatus 75 is in the second handling station 92 and the first holding apparatus 74 is in the processing station 88. Thereafter, in the second handling station 92, the elastomer assembly 10 in the finished manufactured condition is removed from the holding apparatus 75 and an elastomer seal 15 and first and second shaped elastomer portions 12, 14 are again introduced into the holding apparatus 75. While that is happening, processing of the holding apparatus 74 is being implemented in the processing station 88 in the above-described manner.

The thermoplastic layers 82 preferably comprise modified polypropylene and have a melting range of between 120° C. and 150° C. The thickness of the thermoplastic layers 82 is for example between 0.1 mm and 0.6 mm, being in particular 0.3 mm, after the co-extrusion procedure.

In all the Figures of the drawings like parts are denoted by the same references.

Figure 10:
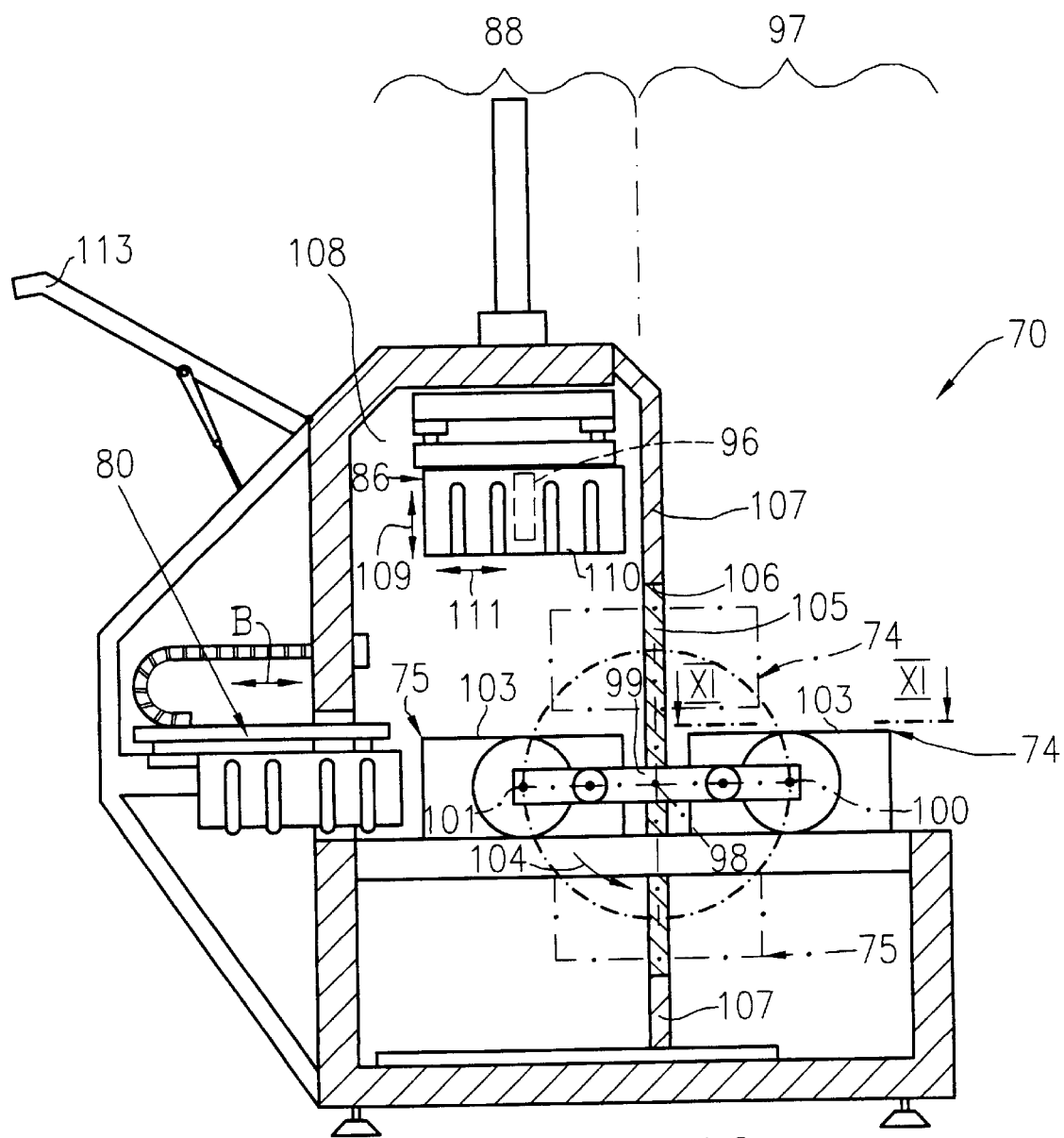
FIG. 10 is a perpendicular section through another embodiment of an apparatus according to the invention.
Figure 11:
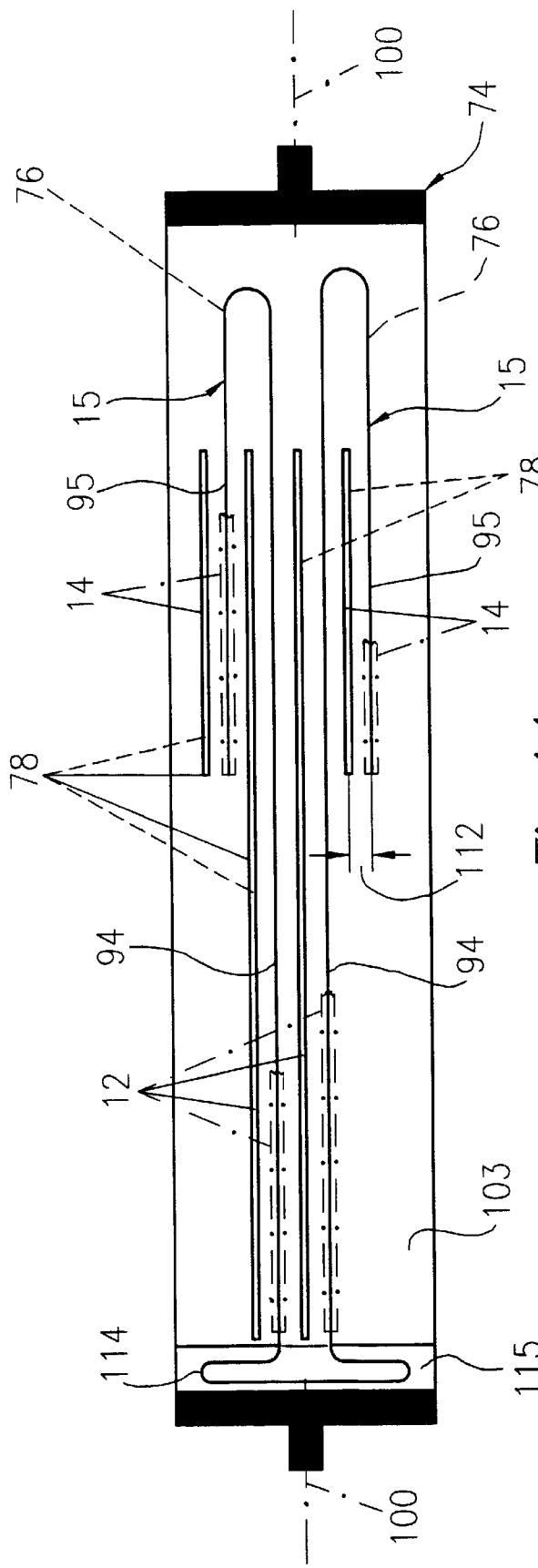
FIG. 11 is a view on line XI—XI in FIG. 10.

FIGS. 10 and 11 show a further embodiment of the apparatus 70 according to the invention.

The apparatus 70 shown in FIG. 10 also has two holding apparatuses 74, 75. It will be seen however that there is only one handling station 97 besides the processing station 88. The holding apparatuses 74, 75 are arranged in diametrical relationship with a horizontal axis 98 and are supported on holding arms 99 rotatably about their horizontal longitudinal axes 100 and 101.

The holding arms 99 are each rotatable through 180°, preferably in the counter-clockwise direction, about the horizontal axis 98, by any suitable drive (not shown). During that rotary movement, a transmission (not shown) ensures that an upper working side 103 of each holding apparatus 74, 75 always remains arranged upwardly. After each rotary movement through 180° the holding apparatuses 74, 75 are stopped in their positions shown in solid lines in FIG. 10. In that situation the holding apparatus 74 is disposed in the handling station 97 and the holding apparatus 75 is disposed in the processing station 88. During the rotary movement in the counter-clockwise direction as indicated by the arrow 104 the holding apparatuses 74, 75 pass through the uppermost and lowermost intermediate positions which are shown in dash-dotted line in FIG. 10.

Arranged between the holding apparatuses 74, 75 is a bulkhead 105 which is rotatable synchronously with the holding arms 99 about the horizontal axis 98. When the holding apparatuses 74, 75 are in the position shown in solid lines in FIG. 10, the bulkhead 105 seals off an opening 106 in a wall 107 of a processing or working space or chamber 108. Slit or labyrinth seals are generally sufficient to afford sealing integrity in that respect.

The processing station 88 is disposed in the substantially closeable working space 108 while the handling station 97 is arranged outside the working space 108. It is thus possible to provide a heating effect with the heating apparatus 80 within the working space 108 comparatively quickly and inexpensively, and at the same time to prevent temperature control in the processing station 88 being undesirably adversely affected by draft.

As shown in FIG. 10, only a single pick-and-place unit 86 is used, which is movable in the directions indicated by a double-headed arrow 109 between the upper rest position shown in solid line and a lower working position. A lower end 110 of the pick-and-place unit is also reciprocal in a horizontal direction by a distance 112 (FIG. 11) in the directions indicated by a double-headed arrow 111. The heating apparatus 80 is shown in FIG. 10 in its left-hand rest position. Similarly as in FIGS. 7 through 9, the heating apparatus 80 is moved in a horizontal direction towards the right in the direction of the double-headed arrow B for the heating operation and is moved back into the rest position again after the heating operation.

An openable service flap 113 permits access to the working space 108.

As shown in FIG. 11, in the case of the holding apparatuses 74, 75 as shown in FIG. 10 the cavities 76, 78 are arranged in substantially parallel relationship with the exception of the arcuate connecting portions in respect of the cavities 76, as shown at the right in FIG. 11. Only a part of the length of the elastomer seal 15 is respectively introduced into the cavities 76, 78, namely the two end regions of the elastomer seal 15. Only that lengthwise portion of the elastomer seal 15 along which the shaped elastomer portions 12, 14 are to be fixed is introduced into the cavities 76. The remaining part 114 of the length of the elastomer seal 15 is disposed in a box 115 beneath the upper working side 103 of the holding apparatus 74.

Independently of the ultimate configuration thereof, both the two ends of the elastomer seal 15 are introduced into the cavity 76 in a rectilinear configuration except for the two right-hand arcuate connecting portions while the shaped elastomer portions 12, 14 are introduced into the cavities 78 in a completely rectilinear configuration. That is readily possible by virtue of the elasticity of the elastomer seal 15 and the shaped elastomer portions 12, 14. There is the same respective distance 112 between the first shaped elastomer portions 12 and the associated regions 94 of the elastomer seal 15 on the one hand and the second shaped elastomer portions 14 and their associated regions 95 of the elastomer seal 15 on the other hand. In that way, it is possible for the shaped elastomer portions 12, 14 to be lifted upwardly in the direction of the double-headed arrow 109 out of the second cavities 78 by the pick-and-place unit 86 in the manner described hereinbefore with reference to FIGS. 7 through 9, and then all jointly displaced in the direction indicated by the double-headed arrow 111 in a horizontal direction by the distance 112. At the end of that motion, the shaped elastomer portions 12, 14 are each disposed in the manner indicated in dash-dotted line in FIG. 11 in aligned relationship above the regions 94, 95. Thus, after the thermoplastic layers 82 have been put into a liquid state the shaped elastomer portions 12, 14 can be pressed against and fixedly connected to the elastomer seal 15 by simple downward movement of the pick-and-place unit 86 in the direction of the double-headed arrow 109.

In operation the operator (not shown) stands to the right in FIG. 10 and, substantially unaffected by the elevated temperature in the working space 108, can remove the elastomer assemblies 10 in the finished manufactured condition from the holding apparatus 74 and introduce a new elastomer seal 15 and new shaped elastomer portions 12, 14 into the cavities 76, 78 of the holding apparatus 74. In the meantime the holding apparatus 75 is being processed within the working space 108 of the processing station 88. As soon as that is concluded, the holding apparatuses 74, 75 are rotated about the horizontal axis 98 in the counter-clockwise direction through 180° as indicated by the arrow 104 until the holding apparatus 74 has assumed the position of the holding apparatus 75 and vice-versa. It is advantageous that operation of the apparatus 70 as shown in FIGS. 10 and 11 requires only one operator who in addition can work substantially stationarily.

What is claimed is:

1. A process for making an elastomer assembly having an elastomer seal and at least one shaped elastomer portion, the process comprising the steps of:
   applying a thermoplastic layer to said shaped elastomer portion;
   heating said thermoplastic layer to a molten state;
   joining said shaped elastomer portion to an associated region of said elastomer seal with said thermoplastic layer positioned between said shaped elastomer portion and said elastomer seal;
   cooling said thermoplastic layer to fixedly connect said shaped elastomer portion to said elastomer seal and thereby form said elastomer assembly;
   wherein said process further comprises the steps of:
      providing a holding apparatus;
      introducing at least a part of said elastomer seal, including said associated region, into said holding apparatus;
      introducing said shaped elastomer portion into said holding apparatus;
      providing a pick and place unit;
      lifting said shaped elastomer portion from said holding apparatus with said pick and place unit;
      positioning said shaped elastomer portion above said associated region of said elastomer seal;
      providing a heating apparatus movable to a position between said elastomer seal and said shaped elastomer portion;
      moving said heating apparatus to said position between said elastomer seal and said shaped elastomer portion prior to said heating step;
      removing said heating apparatus from said position between said elastomer seal and said shaped elastomer portion after said heating step;
      pressing said shaped elastomer portion against said associated region on said elastomer seal with said pick and place unit to effect said joining step;
      moving said pick and place unit away from said holding apparatus; and
      removing said elastomer assembly from said holding apparatus.

2. A process according to claim 1, wherein said thermoplastic layer comprises a modified polypropylene.

3. A process according to claim 1, wherein said thermoplastic layer has a thickness between 0.1 mm and 0.6 mm after said thermoplastic layer is applied to said shaped elastomer portion.

4. A process according to claim 1, wherein said thermoplastic layer has a thickness of 0.3 mm after said thermoplastic layer is applied to said shaped elastomer portion.

5. A process for making an elastomer assembly having an elastomer seal and at least one shaped elastomer portion, the process comprising the steps of:
   applying a thermoplastic layer to said shaped elastomer portion;
   heating said thermoplastic layer to a molten state;
   joining said shaped elastomer portion to an associated region of said elastomer seal with said thermoplastic layer positioned between said shaped elastomer portion and said elastomer seal;
   cooling said thermoplastic layer to fixedly connect said shaped elastomer portion to said elastomer seal and thereby form said elastomer assembly;
   wherein said shaped elastomer portion comprises a main elastomer body, and said step of applying a thermoplastic layer comprises co-extruding said thermoplastic layer with said main elastomer body;
   wherein said process further comprises the steps of:
      providing a holding apparatus;
      introducing at least a part of said elastomer seal, including said associated region, into said holding apparatus;
      introducing said shaped elastomer portion into said holding apparatus;
      providing a pick and place unit;
      lifting said shaped elastomer portion from said holding apparatus with said pick and place unit;
      positioning said shaped elastomer portion above said associated region of said elastomer seal;
      providing a heating apparatus movable to a position between said elastomer seal and said shaped elastomer portion;
      moving said heating apparatus to said position between said elastomer seal and said shaped elastomer portion prior to said heating step;
      removing said heating apparatus from said position between said elastomer seal and said shaped elastomer portion after said heating step;
      pressing said shaped elastomer portion against said associated region on said elastomer seal with said pick and place unit to effect said joining step;
      moving said pick and place unit away from said holding apparatus; and
      removing said elastomer assembly from said holding apparatus.

6. A process according to claim 5, wherein said thermoplastic layer comprises a modified polypropylene.

7. A process according to claim 5, wherein said thermoplastic layer has a thickness between 0.1 mm and 0.6 mm after said thermoplastic layer is applied to said shaped elastomer portion.

8. A process according to claim 5, wherein said thermoplastic layer has a thickness of 0.3 mm after said thermoplastic layer is applied to said shaped elastomer portion.

9. A process for making an elastomer assembly having an elastomer seal and at least one shaped elastomer portion, the process comprising the steps of:
   applying a thermoplastic layer to said shaped elastomer portion;
   heating said thermoplastic layer to a molten state;
   joining said shaped elastomer portion to an associated region of said elastomer seal with said thermoplastic layer positioned between said shaped elastomer portion and said elastomer seal;

cooling said thermoplastic layer to fixedly connect said shaped elastomer portion to said elastomer seal and thereby form said elastomer assembly;

wherein said process further comprising the steps of:

providing a holding apparatus;

providing a handling station for receiving said holding apparatus;

providing a processing station operatively associated with said handling station;

introducing at least a part of said elastomer seal, including said associated region, into said holding apparatus while said holding apparatus is positioned at said handling station;

introducing said shaped elastomer portion into said holding apparatus while said holding apparatus is positioned at said handling station;

moving said holding apparatus from said handling station to said processing station;

providing a pick and place unit within said processing station;

lifting said shaped elastomer portion from said holding apparatus with said pick and place unit;

positioning said shaped elastomer portion above said associated region of said elastomer seal;

providing a heating apparatus within said processing station, said heating apparatus being movable to a position between said elastomer seal and said shaped elastomer portion;

moving said heating apparatus to said position between said elastomer seal and said shaped elastomer portion prior to said heating step;

removing said heating apparatus from said position between said elastomer seal and said shaped elastomer portion after said heating step;

pressing said shaped elastomer portion against said associated region on said elastomer seal with said pick and place unit to effect said joining step;

moving said pick and place unit away from said holding apparatus;

moving said holding apparatus from said processing station to said handling station; and removing said elastomer assembly from said holding apparatus while said holding apparatus is at said handling station.

10. A process according to claim 9, further comprising the step of providing a second holding apparatus, one of said holding apparatuses being at said handling station when the other of said holding apparatuses is at said processing station.

11. A process for making an elastomer assembly having an elastomer seal and at least one shaped elastomer portion, the process comprising the steps of:

applying a thermoplastic layer to said shaped elastomer portion;

heating said thermoplastic layer to a molten state;

joining said shaped elastomer portion to an associated region of said elastomer seal with said thermoplastic layer positioned between said shaped elastomer portion and said elastomer seal;

cooling said thermoplastic layer to fixedly connect said shaped elastomer portion to said elastomer seal and thereby form said elastomer assembly;

wherein said shaped elastomer portion comprises a main elastomer body, and said step of applying a thermoplastic layer comprises co-extruding said removing said elastomer assembly from said holding apparatus while said holding apparatus is at said handling station.

12. A process according to claim 11, further comprising the step of providing a second holding apparatus, one of said holding apparatuses being at said handling station when the other of said holding apparatuses is at said processing station.

\* \* \* \* \*

UNITED STATES PATENT AND TRADEMARK OFFICE
CERTIFICATE OF CORRECTION

PATENT NO.    : 6,485,597 B1
DATED         : November 26, 2002
INVENTOR(S)   : Warnecke et al.

It is certified that error appears in the above-identified patent and that said Letters Patent is hereby corrected as shown below:

Column 4,
Line 4, "operate" should be -- operated --.

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,485,597 B1
DATED : November 26, 2002
INVENTOR(S) : Warnecke et al.

It is certified that error appears in the above-identified patent and that said Letters Patent is hereby corrected as shown below:

Column 12,
After line 29, the following should be inserted into claim 11.

-- thermoplastic layer with said main elastomer body;
    wherein said process further comprises the steps of:
    providing a holding apparatus;
    providing a handling station for receiving said holding apparatus;
    providing a processing station operatively associated with said handling station;
    introducing at least a part of said elastomer seal, including said associated region, into said holding apparatus while said holding apparatus is positioned at said handling station;
    introducing said shaped elastomer portion into said holding apparatus while said holding apparatus is positioned at said handling station;
    moving said holding apparatus from said handling station to said processing station;
    providing a pick and place unit within said processing station;
    lifting said shaped elastomer portion from said holding apparatus with said pick and place unit;
    positioning said shaped elastomer portion above said associated region of said elastomer seal;
    providing a heating apparatus within said processsing station, said heating apparatus being movable to a position between said elastomer seal and said shaped elastomer portion;
    moving said heating apparatus to said position between said elastomer seal and said shaped elastomer portion prior to said heating step;
    removing said heating apparatus from said position between said elastomer seal and said shaped elastomer portion after said heating step;
    pressing said shaped elastomer portion against said associated region on said elastomer seal with said pick and place unit to effect said joining step;

UNITED STATES PATENT AND TRADEMARK OFFICE
CERTIFICATE OF CORRECTION

PATENT NO. : 6,485,597 B1
DATED : November 26, 2002
INVENTOR(S) : Warnecke et al.

It is certified that error appears in the above-identified patent and that said Letters Patent is hereby corrected as shown below:

Column 12 cont'd,
    moving said pick and place unit away from said holding apparatus;
    moving said holding apparatus from said processing station to said handling station; and --

Signed and Sealed this

Seventeenth Day of February, 2004

JON W. DUDAS
*Acting Director of the United States Patent and Trademark Office*